United States Patent [19]

Chan

[11] Patent Number: 5,377,325

[45] Date of Patent: Dec. 27, 1994

[54] BIDIRECTIONAL WAIT CONTROL BETWEEN HOST MODULE AND SLAVE MODULE

[75] Inventor: Wan-Kan Chan, Sabah, Malaysia

[73] Assignee: Acer Incorporated, Taiwan, Prov. of China

[21] Appl. No.: 871,409

[22] Filed: Apr. 21, 1992

[51] Int. Cl.5 ............................................. G06F 13/00
[52] U.S. Cl. ..................................... 395/200; 395/550
[58] Field of Search ................. 395/200, 250, 275, 550

[56] References Cited

U.S. PATENT DOCUMENTS

| | | | |
|---|---|---|---|
| 4,607,348 | 8/1986 | Sheth | 395/275 |
| 5,222,229 | 6/1993 | Fukuda et al. | 395/550 |

Primary Examiner—Robert L. Richardson

Attorney, Agent, or Firm—Townsend and Townsend Khourie and Crew

[57] ABSTRACT

A bidirectional wait control system for controlling data movement between a slower-speed host module and a faster-speed slave module by means of a bus interface, comprises: a first wait control signal generating means in the host module, capable of generating a first wait control signal synchronizing with that of the bus interface; a second wait control signal generating means in the slave module, responsive to the first wait control signal, capable of generating a second wait control signal synchronizing with that of the bus interface; and means, upon each module having been presented with the wait control signal from the other module, for terminating data movement between the host module and the slave module.

12 Claims, 7 Drawing Sheets

BIDIRECTIONAL WAIT CONTROL BETWEEN HOST MODULE AND SLAVE MODULE

BACKGROUND OF THE INVENTION

1. Field of Invention

The present invention relates to a wait control method such that the slower-speed host module can cope with the faster-speed slave module in the bidirectional wait control to control the slave module so as to correctly execute data movement and to terminate the movement cycle.

2. Description of Related Art

In a conventional system, when there are two modules (host and slave), for example, the host module is the central processing unit (CPU) and the slave module is the memory, when the host module requests the slave module to move data, it can assert a movement cycle start signal, such as CS#, ADS#, ... signals to inform the slave module. At this point, since the speed of the host module is higher than that of the slave module, the host module can arbitrarily wait for the slave module to assert a READY signal to respond to the host module. For example, after the READY signal is sent in response to the host module, the data movement cycle is terminated. In the design of this well-known system, this function is limited because only the host module is allowed to wait for the slave module, but not vice versa.

Conversely, when the slave module receives (for example) the movement cycle signal CS#, the slave module can quickly respond to the host module with a prepared READY signal. In other words, when the execution speed of the slave module is higher than the response speed of the host module, a problem will exist, namely, that the host module is not able to receive this READY signal in a normal movement cycle.

For example, in a modularized system the interaction between the host module and the slave module is conducted via a 35 MHz synchronizing interface bus (refer to FIG. 1A), the operating frequency of the host module is 20 MHz, but the operating frequency of the slave module is 33 MHz, which is synchronizing with the frequency of the interface bus. First, the CPU of the host module executes at a speed of 20 MHz. When the host module asserts a CCS# (CPU cycle start signal) intending to read out data from the memory of the slave module, the host module should first convert in a synchronized manner the CCS# into a synchronized HCS# (host cycle start signal) with the 33 MHz interface bus. Then the signal HCS# is sent to the memory (slave module) via the synchronizing interface bus. When the memory (slave module) sends a 33 MHz slave READY signal (SRDY#) indicating the ready state of the readout data to the host module. The host module should convert the SRDY# to a CRDY# such that the 20 MHz CPU can accept it. Thus, a normal wait operation is completed. But a situation may exist in which the slave module speed may be higher than the host module speed.

It is customary to solve the problem of the speed of the memory, the slave module, being higher than the host module CPU speed; for example, generally a latch device in the host module latches the readout data moved from the faster-speed memory (while the CPU reads out data from the memory) until the termination is possible for the readout cycle of the host module CPU, then from the latch device with which the readout data is latched this data is read out to formally terminate this readout cycle.

In the method of solution in which the latch device latches the data in the case when the slave module speed is higher than the host module speed, although this problem of speed disparity between the host and slave modules in moving a single block of data in the data readout cycle of a single CPU can involve latch of data, however, when the memory module applies a pulse train during the movement readout cycle (this is also referred to as the data movement method with a burst cycle), the latch device is unable to effectively latch this continuously emerging data.

In FIG. 1A, for example, in the customary modularized system, the interaction between the 20 MHz host module CPU and the 33 MHz slave module memory is frequency-synchronized through a 33 MHz synchronizing interface bus. However, if in the state with a pulse train burst cycle for readout data as shown in FIG. 1B, a 33 MHz HCS# is asserted after 33 MHz synchronizing conversion of CCS# transmitted by the 20 MHz CPU in the host module; after this HCS# is presented to the slave module from the synchronizing interface bus, data transmission with pulse trains begins. In the situation of not knowing the slower speed of the host module for continuous data movement, such as movement of two data blocks accompanied by two continuous slave-asserted signals SRDY# to notify the host module for data readout, after 20 MHz synchronizing conversion by the host module, the first SRDY# asserts a 20 MHz CRDY# to the 20 MHz CPU. In FIG. 1B, it is clearly at that time that the 20 MHz CRDY# will overlap the 30 MHz second SRDY#. Now, if the above mentioned conventional method of solving the single data block problem is used with a latch device to latch the first data block (D1), then after the readout of the first data block (D1) by the host module CPU, the second data block (D2) continuously generated by the slave module memory will be lost, thus it is unable to latch (for example) the second data block (D2) continuously moved by the block stack.

A purpose of this invention aims to smoothly solve the problem by using a pulse train to read out and move data when the slave module speed is higher than the host module speed.

Another purpose of this invention is to solve the problem of dissimilar termination times of data movement cycles between different speeds of host module and slave module by using a wait control circuit of the host module.

Yet another purpose of this invention is to solve the cycle matching problem in which the speed at which the data is read out from the host module is slower than the speed at which the data is written into the slave module.

SUMMARY OF INVENTION

The present invention relates to a bidirectional wait control between a modularized host module of slower speed and a modularized slave module of faster speed. The bidirectional wait control system for controlling data movement between a slower-speed host module and a faster-speed slave module by means of a bus interface, comprises: a first wait control signal generating means in the host module, capable of generating a first wait control signal synchronizing with that of the bus interface; a second wait control signal generating means in the slave module, responsive to the first wait control signal, capable of generating a second wait control signal synchronizing with that of the bus interface; and means, upon each module having been presented with the wait control signal from the other module, for terminating data movement between the host module and the slave module.

DESCRIPTION OF THE PREFERRED EMBODIMENTS

Figure 2:
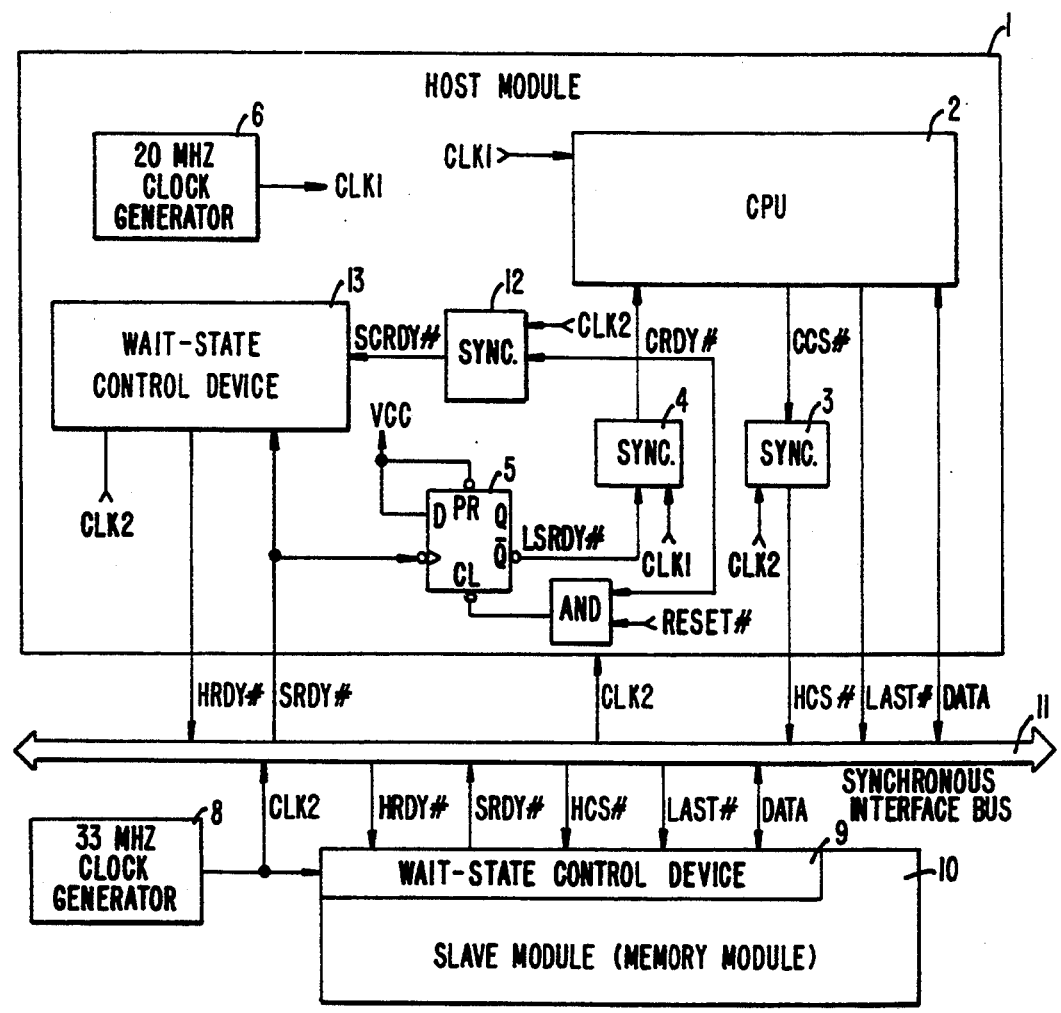
FIG. 2 is a circuit block diagram illustrating an embodiment of the present invention.

FIG. 2 shows a block diagram of a bidirectional wait control system comprising a host module 1, a slave module (memory module) 10, a 33 MHz clock generator 8, and a synchronous interface bus. The major components of the host module 1 are a 20 MHz clock generator 6, a CPU 2, a wait-state control device 13, a first synchronizer 3, a second synchronizer 4, a third synchronizer 12, a flip-flop 5, and an AND gate.

As shown in FIG. 2, the wait-state control device 13 asserts a host wait control signal HRDY# synchronizing with the interface bus 11 to the slave module 10. Before the slave module 10 is presented with host wait-state control signal HRDY# sent by the host wait-state control device 13 of the host module 1, it is still unable to terminate the read-out cycle; that is, at this time the slave module 10 should retain the readout data; this situation is the same as the case when the host module 1 has not been presented with the wait control signal SRDY# sent by the slave module 10; in other words, before the slave-asserted signal SRDY# is ready, it is unable to terminate the cycle.

Figure 3A:
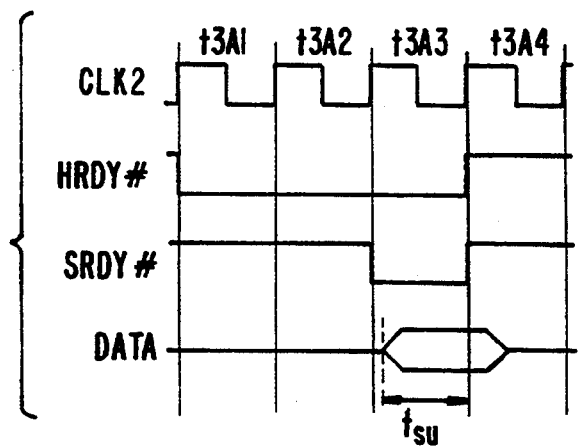
FIG. 3A is a timing diagram illustrating data movement between a higher-speed host module and a slower-speed slave module.
Figure 3B:
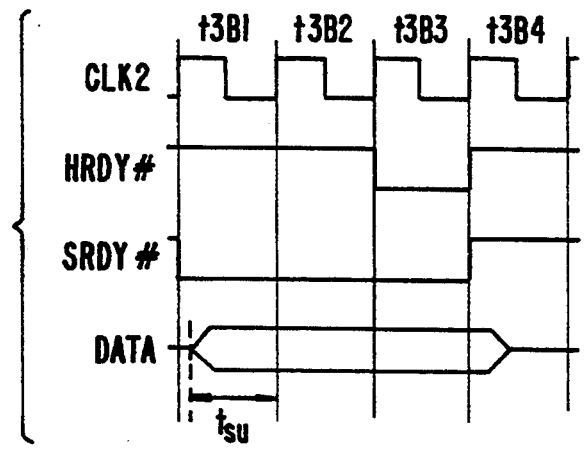
FIG. 3B is a timing diagram illustrating data movement between a slower-speed host module and a higher-speed slave module.

As shown above, by using the design of this wait-state control device 13 in this invention, systematically in two situations: one, in FIG. 3A, the speed of the slave module 10 is slower than that of the host module 1, and two, as in FIG. 3B, the speed of the host module 1 is slower than the speed of the slave module 10, to separately solve the problem of data readout by using the method of moving with pulse trains.

In FIG. 3A, the wait-state control device 13 of the host module 1 will send a HRDY# to indicate readiness for data readout. However, since the speed of the slave module 10 is slower without data readiness, in other words, the slave module 10 has not sent the SRDY# but first the HRDY# should be maintained at a logic low level by the host module 1 until the slave module 10 sends the SRDY#, then the host module 1 and slave module 10 can be ordered to terminate, respectively, the wait cycle.

After the slave module 10 sends the SRDY#, it can satisfy the time tsu (setup time) required by the data.

In FIG. 3B, since the speed of the slave module 10 is higher than that of the host module, when the slave module 10 has prepared data capable of satisfying the setup time tsu and asserts an SRDY#, and when the wait-state control device 13 of the host module 1 has not yet been able to assert an HRDY# indicating that the host module 1 is still unable to read out the data, at this time the slave module 10 should consistently assert the SRDY# at logic low level and retains the data that has been generated. The slave module cycle is not terminated until the wait-state control device 13 of the host module 1 asserts the HRDY#. Furthermore, the host module cycle is simultaneously terminated.

Whether in FIG. 3A with slower speed of the slave module 10, or in FIG. 3B, with slower speed of the host module 1, by using the design of the wait-state control device of this invention, both the host module 1 and the slave module 10 can terminate their cycles when their respective HRDY# and the SRDY# appear.

Figure 1A:
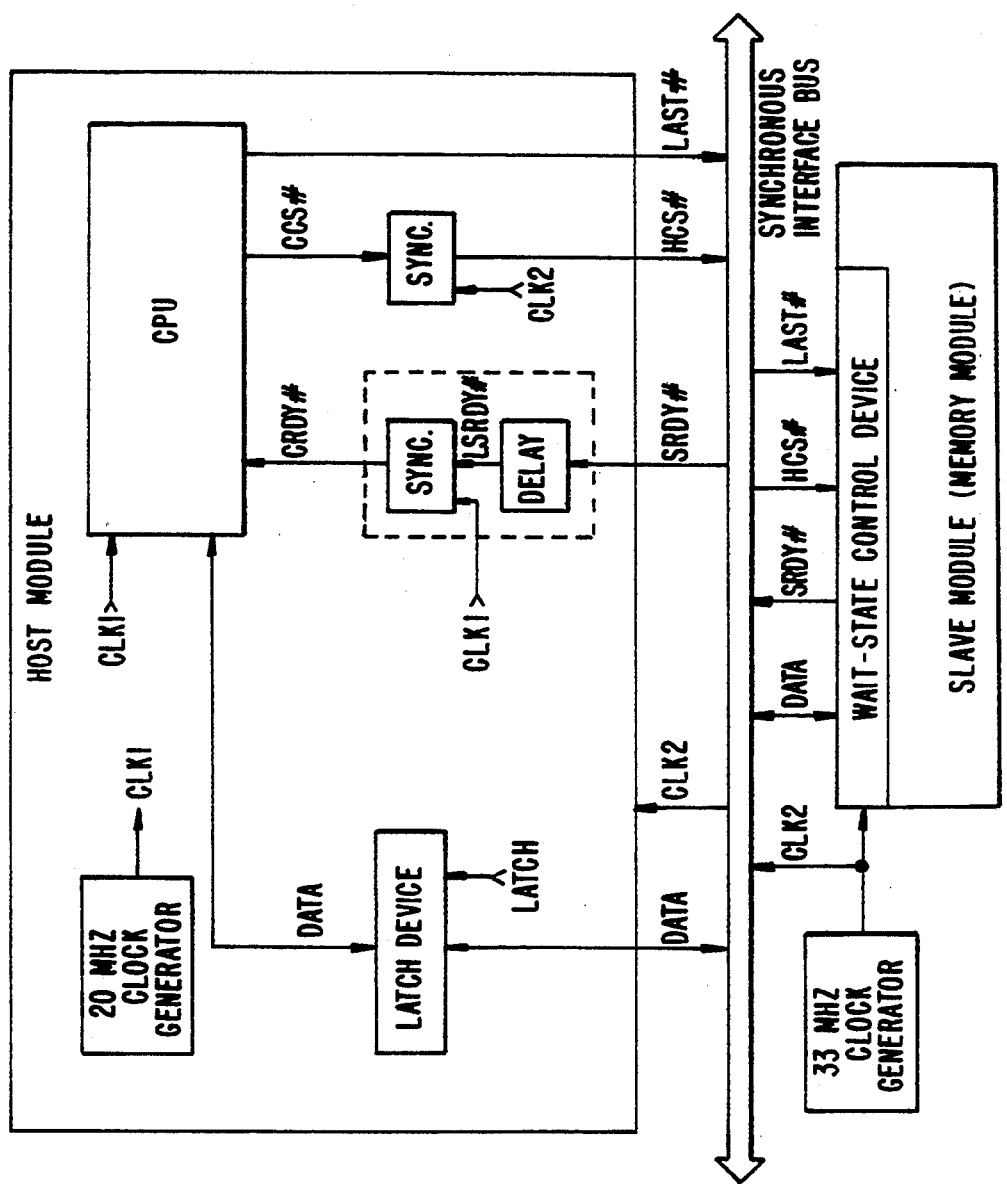
FIG. 1A is a circuit block diagram of the prior art.
Figure 1B:
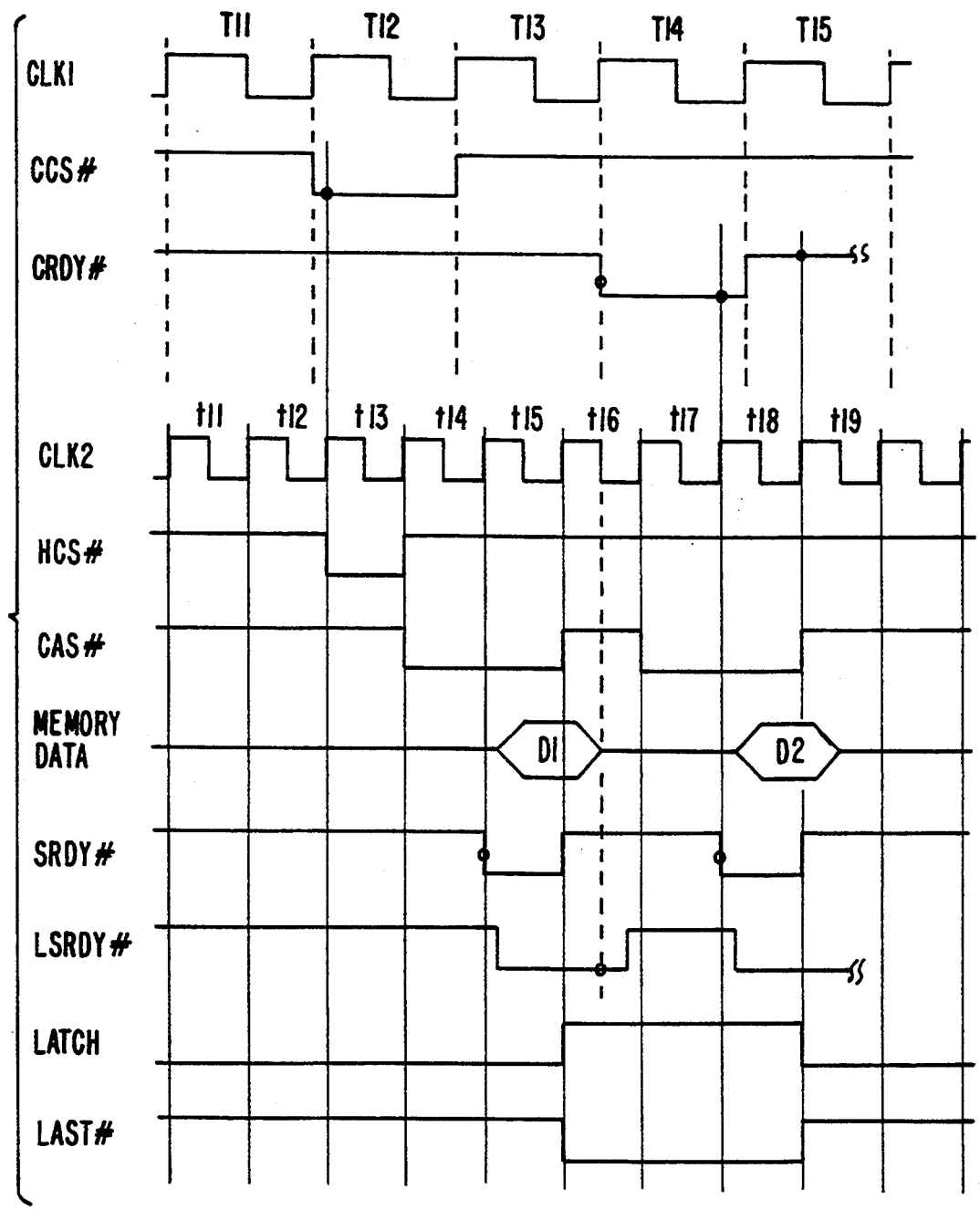
FIG. 1B is a timing diagram of FIG. 1A illustrating data loss in burst cycle.
Figure 4:
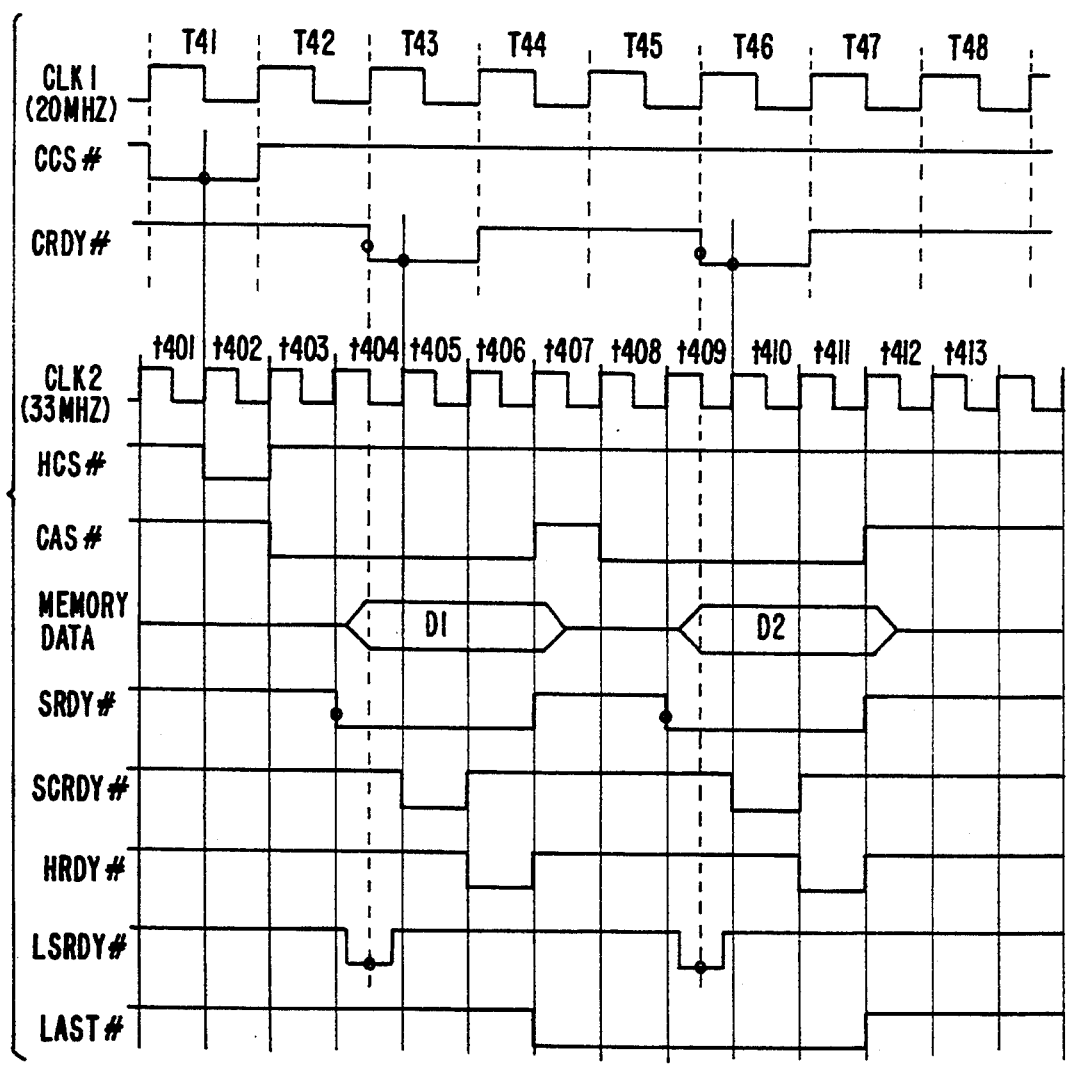
FIG. 4 is a timing diagram illustrating data movement between a slower-speed host module and a faster-speed slave module in burst read cycle.

FIG. 4 is a timing diagram for solving the problem of pulse train readout cycle corresponding to the conventional example in FIG. 1B. In the diagram, when the 20 MHz CPU 2 sends a CCS# and asserts a 33 MHz HCS# via the 33 MHz synchronizing conversion, after the slave module 10 is presented with this HCS# from the synchronous interface bus 11, the slave module 10 can assert an SRDY# indicating that the data has been well prepared. Via the bus, the SRDY# is first converted while synchronized at 20 MHz to the host module 1 to assert the CRDY# to the CPU 2. At this time, after the wait-state control device 13 of the host module 1 in this invention acknowledges that the CPU 2 has received this CRDY# and has correctly read out the data, then the wait-state control device 13 sends an HRDY# to the synchronous bus 11, and after the slave module 10 is presented with this HRDY# from the synchronous bus 11, both the data and the SRDY# are terminated for preparing the sending of a second data block. In this manner, with cyclical repetition of the bidirectional wait operation of the first data block, it is possible to positively, reliably, and without error complete the data readout by using pulse train sending cycle.

Furthermore, the wait-state control device 13 of the host module 1 can solve another problem of mismatching because the speed at which the data is read out by the host module 1 is slower than the speed at which the data is written in by the slave module 10. For example, in FIG. 5, the HRDY# cannot be sent before the host module 1 has yet sent out the readout data; however, when the read out data satisfies the setup time tsu, then the wait-state control device 13 of the host module 1 can send the HRDY# to notify the slave module 10 that the readout data has been well prepared for write-in.

After the slave module 10 is presented with the HRDY# at logic low level, the module can write in the data. However, after the data write-in operation has been completed, the slave module 10 sends an SRDY# to notify the host module 1 in terminating the cycle. Before the host module 1 sends the HRDY# and its readout data but not yet having been presented with the SRDY# from the slave module 10, the host module 1 should consistently retain the HRDY# and its data. After the host module 1 is presented with the SRDY#, it simultaneously terminates the HRDY# and the data.

Figure 6:
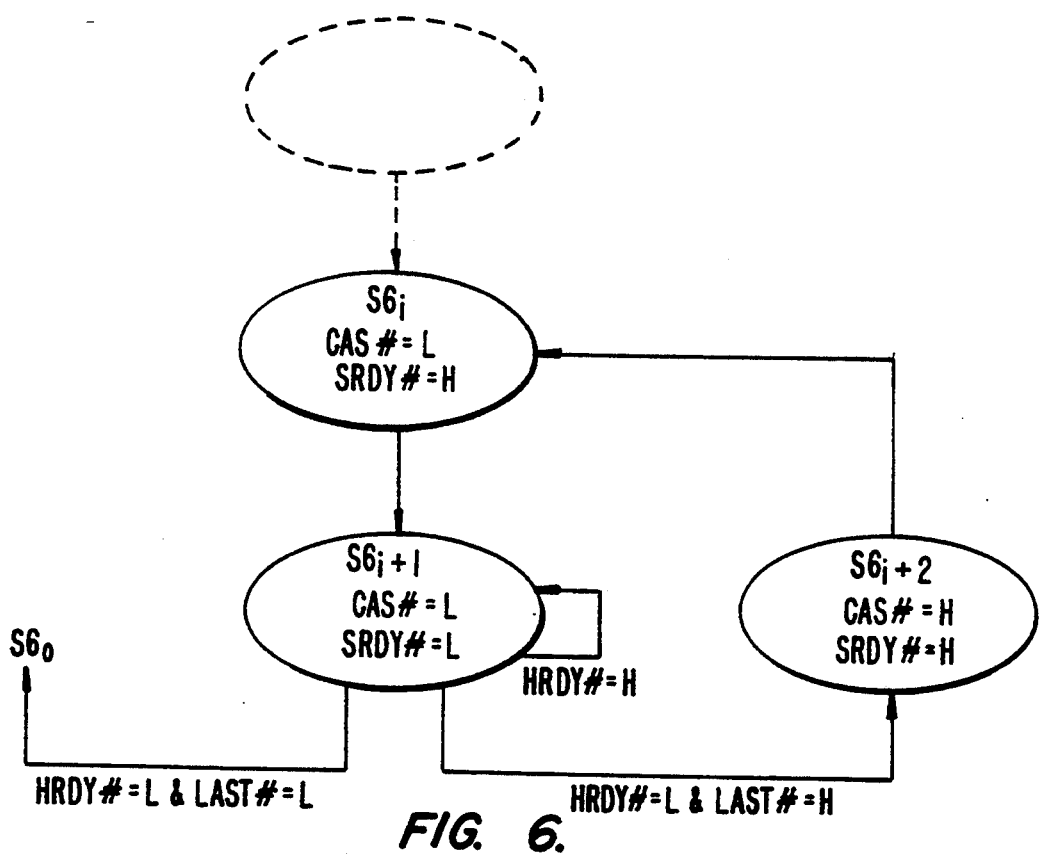
FIG. 6 is a state machine diagram of the slave module generating SRDY# signal in accordance with HRDY# signal in a read cycle.

FIG. 6 is the state machine diagram illustrating an embodiment of the present invention of a wait control system between a host module and a slave module in the burst read cycle of the DRAM. This design can be accomplished by a programmable logic device (PLD or PAL) to achieve the state machine function. The timing of this state machine is the same as that depicted in FIGS. 3A, 3B and 4.

In FIG. 6, the system enters $S_{6i}$ from $S_{6i+2}$ or other states (indicated by the dotted-line portion), when the system is in $S_{6i}$, the Column Address Select CAS# signal of the DRAM is enabled, the selected data in the DRAM is ready to be outputted. When the system enters $S_{6i+1}$ from $S_{6i}$, the data in the DRAM fulfills the $T_{su}$ timing requirement, enabling SRDY# and notifying the host module that the data is ready for reading. Based on the present invention, the HRDY# of the host module must be enabled first before the read data and read cycle can be completed as shown in FIGS. 3A, 3B and 4. Therefore, $S_{6i+1}$ will remain in the same state until HRDY# of the host is enabled, then it will leave the state, $S_{6i+1}$. While the system leaves the state $S_{6i+1}$ (HRDY#=L), the system will check the LAST# signal of the host module. This LAST# signal will inform the slave whether or not the burst cycle of the host module is completed. When LAST# signal is enabled, indicating that the data transmission cycle is the last one of the burst cycle at that time. In state $S_{6i+1}$, LAST# is not enabled (LAST#=H), the system will enter $S_{6i+2}$ disabling CAS for precharging CAS#. Leaving the state $S_{6i+2}$, the system will return to $S_{6i}$ to start another burst read cycle. In state $S_{6i+1}$, if LAST# is enabled (LAST#=L), indicating the burst read cycle is completed, the system will then return to the initial state $S_{60}$ and reset the data transmission cycle of the DRAM.

Figure 7:
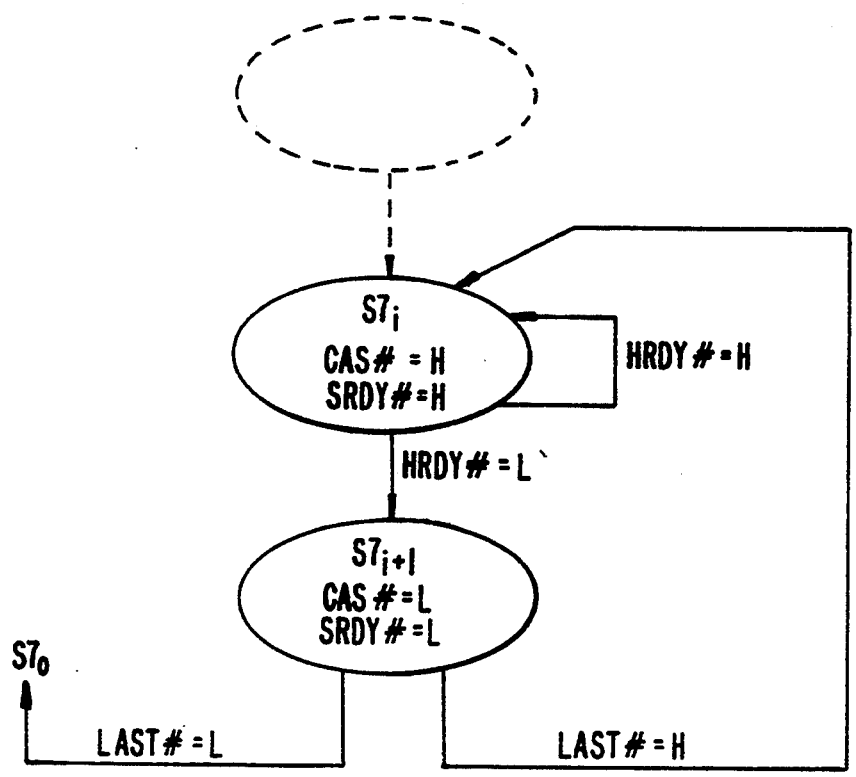
FIG. 7 is a state machine diagram of the slave module generating SRDY# signal in accordance with HRDY# signal in a write cycle.

FIG. 7 is the state machine diagram illustrating an embodiment of the present invention of a wait control system between a host module and a slave module in the burst write cycle of the DRAM. This design can be accomplished by a programmable logic device (PLD or PAL) to achieve the state machine function. The timing of this state machine is the same as that depicted in FIGS. 4 and 5.

In FIG. 7, the system enters $S_{7i}$ from $S_{7i+1}$ or other states (indicated by the dotted-line portion). The slave module has to wait for the HRDY# signal from the host module ($T_{su}$ is fulfilled) before data is written into the memory as shown in the timing diagram of FIG. 5. $S_{7i+1}$ will remain in the same state until HRDY# of the host is enabled (HRDY#=L). The system will then enter $S_{7i+1}$ enabling CAS# and write data in the selected memory address. Meanwhile SRDY# is enabled notifying the host module that the data is ready for reading. State $S_{7i+1}$ will determine the next state based on the LAST# signal. If the LAST# is not enabled (LAST#=H), the host module will continue to perform the next burst write cycle, entering state $S_{7i}$ from state $S_{7i+1}$ and repeating the whole write cycle. If LAST# is enabled (LAST#=L), then the host module will complete the write cycle, by proceeding from state $S_{7i+1}$ to the initial state $S_{70}$ and wait for the next transmission cycle of the DRAM.

Figure 8:
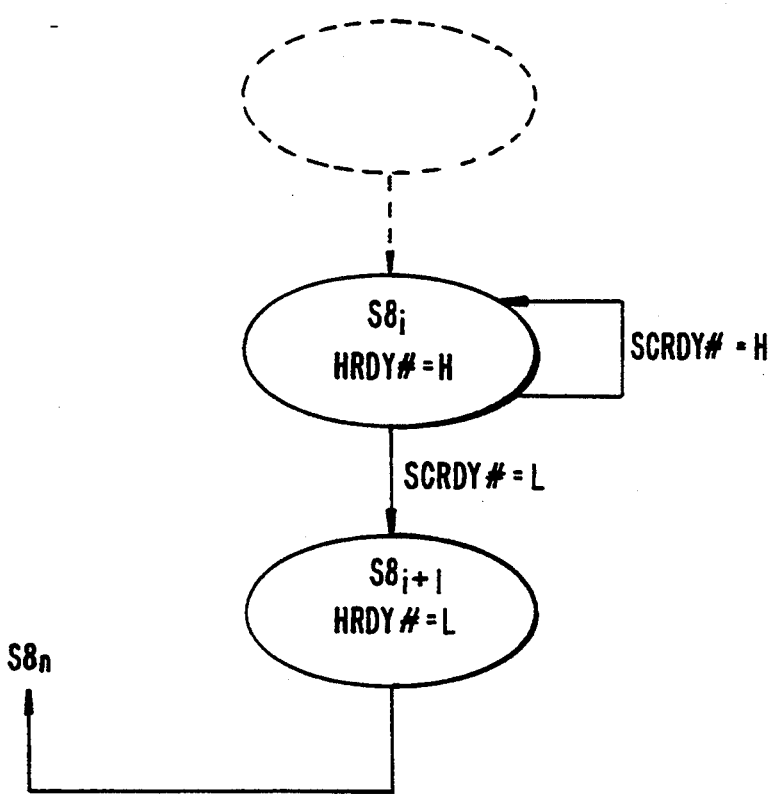
FIG. 8 is a state machine diagram of the host module converting SCRDY# signal into HRDY# signal in accordance with SRDY# signal in a read cycle.

FIG. 8 is the state machine diagram illustrating the wait control of the host module in a read cycle. The timing of this state machine is the same as that depicted in FIGS. 3A and 3B.

In FIG. 8, when the system enters state $S_{8i}$ indicating that the host module generates a read cycle HCS# to the memory of the slave module and is waiting for the response signal SRDY#. When the slave module responses and sends a ready signal SRDY# to the host (the data fulfills the $T_{su}$ requirement), data can then be read. SRDY# will pass through the 20 MHz synchronizer synchronizing the CRDY# for CPU. Meanwhile, this signal will be input into the wait control device as shown in FIG. 2. The wait control circuit of the host module will synchronize with the 33 MHz SCRDY# signal for the state machine operated in 33 MHz. State $S_{8i}$ will wait till SCRDY# is enabled (SCRDY#=L), and enter state $S_{8i+1}$ generating a synchronized 33 MHz signal HRDY# for the memory of the slave module. This indicates that the host module has correctly read the data and the memory can finish its read cycle. The system will enter $S_{80}$ from $S_{8i+1}$ for the next cycle.

Figure 9:
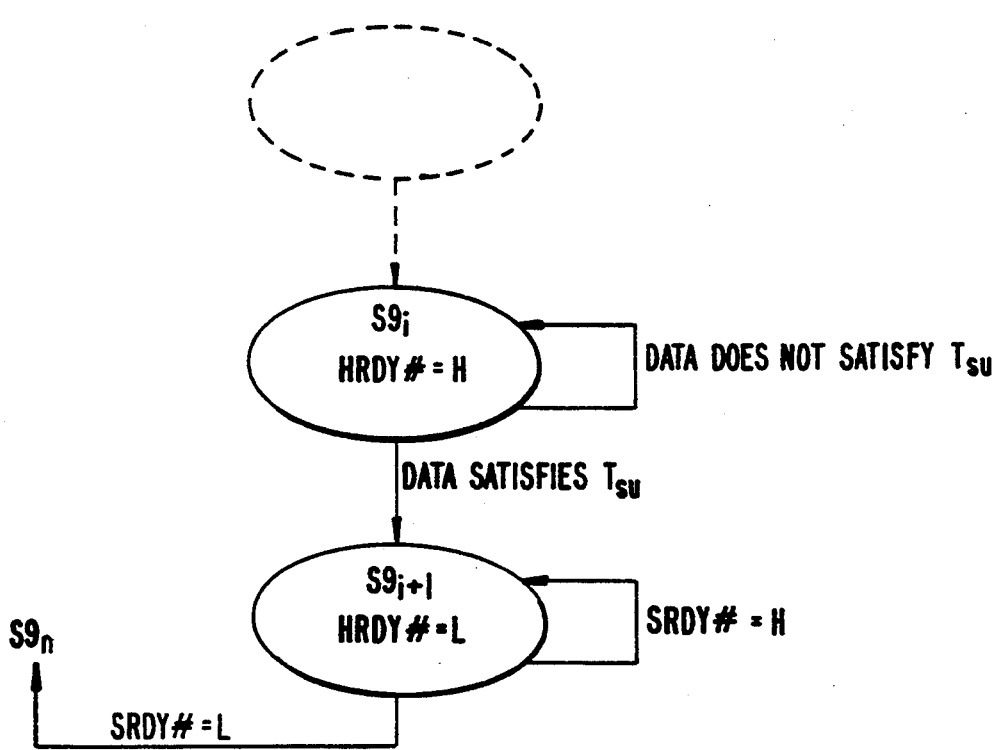
FIG. 9 is a state machine diagram of the host module generating HRDY# signal from SCRDY# signal in a read cycle.

FIG. 9 is the state machine diagram illustrating the wait control of the host module in a write cycle. The timing of this state machine is the same as that depicted in FIG. 5.

Figure 5:
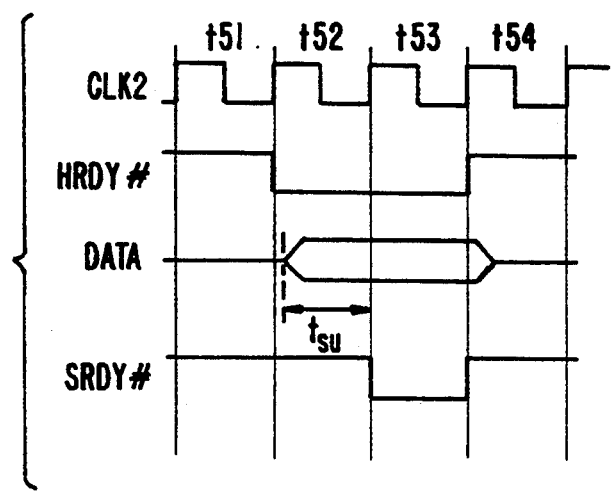
FIG. 5 is a timing diagram of the present invention using bidirectional wait control signals (HRDY# and SRDY#) in write cycle of the host module.

In FIG. 9, the host module confirms the written out data satisfying the $T_{su}$ requirement, then it sends a HRDY# signal to the slave module for writing data in the memory of the slave module. As shown in FIG. 5, when the system is in state $S_{9i}$, The host control circuit has sent a HCS# signal to the slave module. The slave module will wait for the enabling of HRDY#. State $S_{9i}$ will remain in its state until the data of the CPU appeared in the 33 MHz synchronizing bus interface has fulfilled the $T_{su}$ requirement. The system will then enter the state $S_{9i+1}$ and enable HRDY#. $S_{9i+1}$ will remain in its state until SRDY# is enabled. After the slave module has enabled the SRDY#, the system will then enter the initial state $S_{90}$ from $S_{9i+1}$ for the next action.

In this way, it can be ensured that the data can correctly be written into the slave module at any speed for the host module.

As mentioned above, by using examples of 20 MHz host module, 33 MHz slave module and 33 MHz synchronous bus 11, this invention concisely describes a solution to the problem of inability to match when the host module speed in data readout is slower than the slave module speed in sending out or writing in data, by using a bidirectional wait control between two modules in a modularized system. However, the execution of this presented explanation is not limited to this invention, a person skilled in the art knows that the wait between modules or readout of host module data are not limited to 20 MHz CPUs, 33 MHz memories and 33 MHz synchronizing interface bus, the wait control signal in the above-mentioned embodiment can be considered as the general situation of the prepared signal. For example, the CPU can be a driving component of the other (such as) direct memory access DMA. Therefore, the scope of protection of this invention is defined by the following claims.

What is claimed is:

1. A bidirectional wait control system for controlling data movement between a host module and a slave module, the data movement occurring via a synchronous bus interface coupled between the host module and the slave module, the host module operating at a first speed and the slave module operating at a second speed, the second speed being faster than the first speed, the bidirectional wait control system comprising:

means for generating a first wait control signal in the host module, the first wait control signal being synchronized with the bus interface;

means for generating a second wait control signal in the slave module, responsive to the first wait control signal, the second wait control signal being synchronized with the bus interface; and means for terminating data movement between the host module and the slave module when the slave module has received the first wait control signal and the host module has received the second wait control signal.

2. A bidirectional wait control system for controlling data movement between a host module and a slave module, the data movement occurring via a synchronous bus interface coupled between the host module and the slave module, the host module operating at a first speed and the slave module operating at a second speed, the first speed being faster than the second speed, the bidirectional wait control system comprising:

means for generating a first wait control signal in the slave module, the first wait control signal being synchronized with the bus interface;

means for generating a second wait control signal in the host module, responsive to the first wait control signal, the second wait control signal being synchronized with the bus interface; and means for terminating data movement between the host module and the slave module when the host module has received the first wait control signal and the slave module has received the second wait control signal.

3. A bidirectional wait control system for controlling data movement between a host module and a slave module, the data movement occurring via a synchronous bus interface coupled between the host module and the slave module, the bidirectional wait control system comprising:

means for generating a first wait control signal in the host module, the first wait control signal being synchronized with the bus interface;

means for generating a second wait control signal in the slave module, the second wait control signal being synchronized with the bus interface; and means for terminating data movement between the host module and the slave module when the slave module has received the first wait control signal and the host module has received the second wait control signal.

4. A method for bidirectionally controlling data movement between a host module and a slave module, the data movement occurring via a synchronous bus interface coupled between the host module and the slave module, the host module operating at a first speed and the slave module operating at a second speed, the second speed being faster than the first speed, the method comprising the steps of:

generating a first wait control signal with the host module, the first wait control signal being synchronized with the bus interface;

generating a second wait control signal with the slave module in response to the first wait control signal, the second wait control signal being synchronized with the bus interface; and terminating data movement between the host module and the slave module when the slave module has received the first wait control signal and the host module has received the second wait control signal.

5. A method for bidirectionally controlling data movement between a host module and a slave module, the data movement occurring via a synchronous bus interface coupled between the host module and the slave module, the host module operating at a first speed and the slave module operating at a second speed, the first speed being faster than the second speed, the method comprising the steps of:

generating a first wait control signal with the slave module, the first wait control signal being synchronized with the bus interface;

generating a second wait control signal with the host module in response to the first wait control signal, the second wait control signal being synchronized with the bus interface; and terminating data movement between the host module and the slave module when the host module has received the first wait control signal and the slave module has received the second wait control signal.

6. A method for bidirectionally controlling data movement between a host module and a slave module, the data movement occurring via a synchronous bus interface, the method comprising the steps of:

generating a first wait control signal with the host module, the first wait control signal being synchronized with the bus interface;

generating a second wait control signal with the slave module, the second wait control signal being synchronized with the bus interface; and terminating data movement between the host module and the slave module when the slave module has received the first wait control signal and the host module has received the second wait control signal.

7. The bidirectional wait control system of claim 1 wherein the host module comprises a processor module and the slave module comprises a memory module.

8. The bidirectional wait control system of claim 2 wherein the host module comprises a processor module and the slave module comprises a memory module.

9. The bidirectional wait control system of claim 3 wherein the host module comprises a processor module and the slave module comprises a memory module.

10. The method of claim 4 wherein the host module comprises a processor module and the slave module comprises a memory module.

11. The method of claim 5 wherein the host module comprises a processor module and the slave module comprises a memory module.

12. The method of claim 6 wherein the host module comprises a processor module and the slave module comprises a memory module.

* * * * *